United States Patent [19]
Ehrsam

[11] Patent Number: 4,734,116
[45] Date of Patent: Mar. 29, 1988

[54] METHOD AND APPARATUS FOR GENERATING AN ICE CRYSTAL SUSPENSION

[75] Inventor: Christian Ehrsam, Winterthur, Switzerland

[73] Assignee: Sulzer Brothers Limited, Winterthur, Switzerland

[21] Appl. No.: 38,856

[22] Filed: Apr. 15, 1987

[30] Foreign Application Priority Data

Apr. 23, 1986 [CH] Switzerland ............... 1646/86-1

[51] Int. Cl.[4] ............................................. B01D 9/04
[52] U.S. Cl. ........................................ 62/532; 34/5; 34/15; 34/92; 62/123; 137/13
[58] Field of Search ............... 62/123, 532; 34/5, 15, 34/92; 137/13

[56] References Cited

U.S. PATENT DOCUMENTS

| | | | |
|---|---|---|---|
| 3,350,297 | 10/1967 | Torobin | 62/123 |
| 4,003,213 | 1/1977 | Cox | 62/324.3 |
| 4,081,257 | 3/1978 | Lassmann | 62/532 |
| 4,218,893 | 8/1980 | Cheng et al. | 62/532 |
| 4,474,031 | 10/1984 | Collet | 62/324.3 |

*Primary Examiner*—Ronald C. Capossela
*Attorney, Agent, or Firm*—Kenyon & Kenyon

[57] ABSTRACT

The apparatus employs a compressor for compressing a flow of water vapor with an ethanol additive and a condensation chamber in which the compressed water vapor may be condensed to form ice crystals. A coolant circuit in provided in the condensation chamber to melt the ice crystals from the heat exchange surfaces for subsequent formation of primary ice in a bottom chamber. A recirculation circuit is provided to convey the primary ice into a freeze drying chamber for freeze-drying of the vapor at the triple point. The resulting product is passed to a water separator prior to ultimate use.

20 Claims, 5 Drawing Figures

METHOD AND APPARATUS FOR GENERATING AN ICE CRYSTAL SUSPENSION

This invention relates to a method and apparatus for generating an ice crystal suspension. More particularly, this invention relates to a method and apparatus for generating an ice crystal suspension by freeze drying at the triple point.

Heretofore, various techniques have been known for generating an ice crystal suspension. For example, U.S. Pat. No. 4,474,031 describes a heat pump plant in which ice is generated in a vacuum tank by desublimation of uncompressed water vapor. However, one serious disadvantages in this technique is that only a batch operation is permitted. Hence, the ice can only be generated on a discontinuous basis.

U.S. Pat. No. 4,003,213 describes a method wherein an ice crystal suspension is produced in conjunction with a heat pump process in a vacuum tank at the triple point. In this case, the vapor which arises is admixed with an antifreeze agent and is condensed by an indirect heat exchange with an evaporating coolant. However, this method is extremely costly since the vapor which is condensed in the antifreeze agent must subsequently be expelled again.

U.S. Pat. No. 4,003,213 also describes another method for generating ice by freeze drying at the triple point wherein the resulting vapor is compressed and condensed at a temperature above the triple point by heat exchange with ambient air. A similar method is also disclosed in the book "Principles of Desalination" by K. S. Spiegler, ed., (New York, 1966, Academic Press), in Chapter 7, "Freezing Methods" by A. E. Snyder. In this case, the method of desalinating sea water uses a pre-cooler in which ice crystal seeds are to form in order to later serve in the process of generating ice crystals by crystal growths. Condensation of the vapor which arises and the subsequent compression is also performed at a temperature above the triple point. However, serious disadvantages occur in the methods described in the patent and in the book in that expensive compressors are required for large volume flows because of the relatively high compression ratios, for example in excess of 1.3, which have been required.

Accordingly, it is an object of the invention to achieve a continuous production of ice crystal suspensions for large volume flows.

It is another object of the invention to provide an economic method and apparatus for generating an ice crystal suspension.

It is another object of the invention to achieve the generation of ice crystal suspensions at the triple point at low compression ratioes.

It is another object of the invention to provide relatively simple compressors for generating ice crystal suspensions.

Briefly, the invention provides a method and apparatus for generating an ice crystal suspension.

In accordance with the method, a flow of water vapor is admixed with a water-soluble additive, such as ethanol, having a lower boiling point than water and compressed to obtain a compressed mixture of water and additive. Thereafter, the mixture is cooled in heat exchange relation with a flow of coolant to the triple point and subsequently condensed to at least partially freeze the mixture to obtain a heterogeneous mixture of ice particles and liquid. Thereafter, at least a portion of the mixture of ice particles and liquid is freeze dried at the triple point to form an ice crystal suspension.

Condensation of the cooled mixture may be performed on heat exchange surfaces so that ice particles form on the heat exchange surfaces. In this case, the heat exchange surfaces can be defrosted in order to remove the ice particles for use in the heterogeneous mixture of ice particles and liquid. During this time, the additive can be admixed with the compressed vapor. Alternatively, the additive can be admixed on an intermittent basis in the compressed vapor.

The apparatus includes a first cooling chamber having heat transferring surfaces to receive a flow of compressed water vapor containing the water-soluble additive in indirect heat exchange relation with a flow of coolant in order to condense and at least partially freeze out ice particles on the heat transferring surfaces. In addition, the apparatus has at least one compressor for delivering a compressed flow of water vapor into the first chamber and a second chamber connected to the first chamber for forming an ice containing suspension from the ice received from the first chamber. Still further, a third chamber is provided for receiving a flow of the ice containing suspension from the second chamber for freeze drying therein in order to generate the ice crystal suspension.

In one embodiment, the three chambers of the apparatus are vertically disposed in a common casing with the third chamber for freeze drying purposes being in communication with the compressor to deliver a flow of water vapor which is generated during freeze drying to the compressor. In this respect, the compressor may be made as a vapor jet compressor.

In another embodiment, the three chambers are disposed in a common casing with the freeze drying and condensing chambers being horizontally disposed with respect to each other while the remaining chamber is vertically disposed below the condensing chamber. In this embodiment, the compressor may be in the form of an axial compressor. Further, a second compressor in the form of a vapor jet compressor may be disposed in series with the axial compressor for compressing the water vapor for delivering into the second chamber in which the initial condensation occurs.

The apparatus also includes a vapor/water/ice circulation circuit for circulating the water vapor, water and ice crystals through the apparatus. In addition, the apparatus also includes a coolant circuit for the coolant used in the condensation chamber.

These and other objects and advantages of the invention will become more apparent from the following detailed description taken in conjunction with the accompanying drawings wherein:

Figures 1A, 1B:
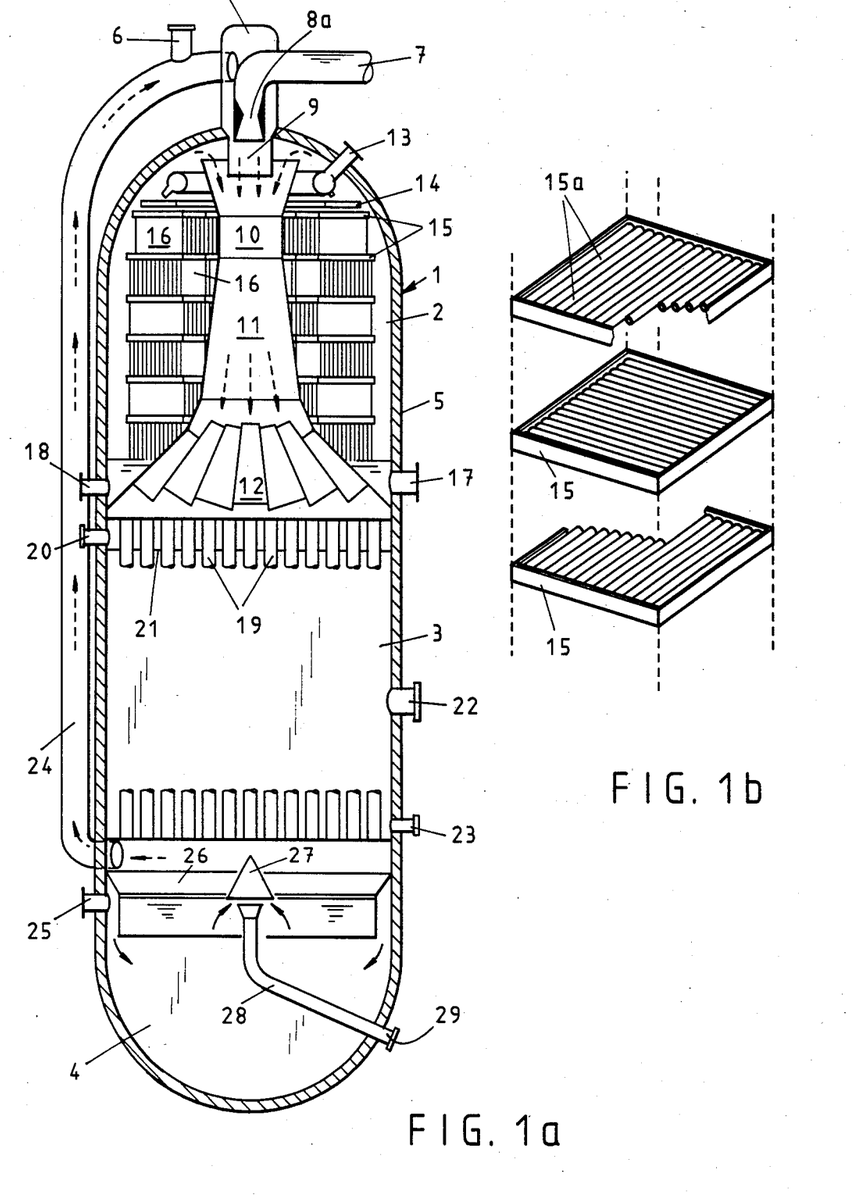
FIG. 1a diagrammatically illustrates a cross sectional view through an apparatus constructed in accordance with the invention.
FIG. 1b illustrates an exploded view of various film forming grilles used in the apparatus of FIG. 1.

Referring to FIG. 1a, the apparatus is in the form of an ice generating plant 1, hereinafter termed an ice generator. As shown, the ice generator includes a freeze drying chamber 2, a condensation chamber 3 and a bottom chamber 4 which are vertically disposed within a common pressure-resistant casing 5. During operation, the casing 5 is under vacuum and is connected to a vacuum pump (not shown) by a suction duct 6.

A duct 7 communicates with the upper end of the casing 5 for delivering a vapor mixture into the casing 5. In addition, the terminal end of the duct 7 forms a propelling nozzle 8a which is disposed within a suction or nozzle chamber 8 of a vapor jet compressor in order to propel the vapor flow therethrough. The nozzle chamber 8 is, in turn, in communication with a first mixing chamber 9 for purposes as described below, as well as with a second mixing chamber 10. As indicated, the second mixing chamber 10 receives a flow of water vapor from the freeze drying chamber 2 for mixing with the vapor delivered through the duct 7 and from the nozzle chamber 8.

The mixing chamber 10 communicates directly with a main diffuser 11 which, in turn, is connected to a bank of small diffusers 12 arranged like facets.

The freeze drying chamber 2 houses a coarse distributor 13 for recirculated ice crystal suspension and a fine distributor 14. As indicated, the coarse distributor 13 is arranged to distribute an ice crystal suspension over the fine distributor 14 which, in turn, distributes the suspension over a plurality of vertically disposed and spaced apart grilles 15. As indicated in FIG. 1b, each grill 15 is formed of a plurality of synthetic plastic tubes 15a such that the descending suspension is formed into a plurality of freely falling sheets 16 as indicated in FIG. 1b.

The freeze drying chamber 2 also communicates at the lower end with a pair of outlet spigots or unions 17, 18 for purposes as described below.

The condensation chamber 3 contains a falling film evaporator having condenser/evaporator tubes 19. In addition, the chamber 3 communicates with an inlet spigot or union 20 at the upper end and two outlet spigots 22, 23, one for vapor and one for condensed coolant. A distributor plate 21 also connects the inlet union 20 with the tubes 19 so as to deliver coolant thereto. In addition, the lower part of the condensation chamber 19 is connected to a return duct 24 for conveying a flow of water vapor enriched with an additive to the nozzle chamber 8 of the vapor jet compressor.

The bottom chamber 4 is connected with an inlet union 25 through which a supply of water which is low in additive can be introduced. In addition, the upper part of the chamber 4 houses a distributor 26 for water which is essentially comprised of an annular duct with a sloping cover. A deflector cone 27 is also disposed in the center of the distributor 26 for thawed ice. A duct 28 extends from below the cone 27 and communicates with a discharge spigot 29 for discharging an ice crystal suspension (primary ice) produced in the bottom chamber 4.

Figure 2A:
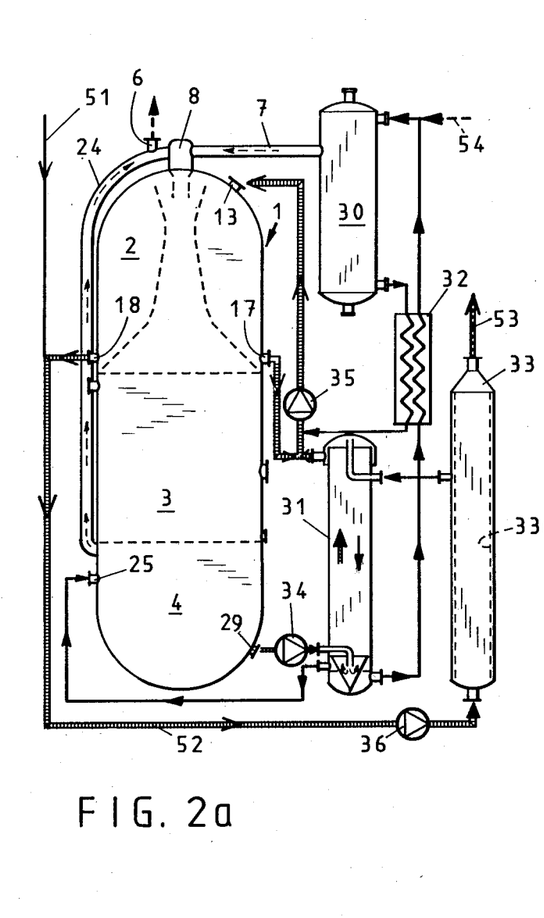
FIG. 2a illustrates a schematic view of a vapor/water/ice circulation circuit in accordance with the invention.

Referring to FIG. 2a, the ice generator 1 cooperates with a product circulation circuit which includes a vapor generator 30, a counter flow washer 31 for primary ice, a counter flow heat exchanger 32 and a dewatering unit 33 having a tubular screen 33a. In addition, the circuit includes a pump 34 for the primary ice suspension, a circulating pump 35 for the secondary ice suspension and a product pump 36. As indicated, the counter flow washer 31 has a bottom end communicating with the bottom chamber 4 via the spigot 39 and pump 34 in order to receive a flow of ice-containing suspension therefrom. In addition, the upper end of the washer 31 communicates with the freeze drying chamber 3 via the pump 35 and the inlet spigot 13 in order to deliver a flow of additive-containing water vapor thereto.

The vapor generator 30 communicates with a bottom end of the washer 31 via the heat exchanger 32 in order to receive and evaporate a flow of additive-containing water. In addition, the vapor generator 30 communicates via the duct 7 with the vapor jet compressor in order to deliver a flow of additive-containing water vapor thereto.

The bottom end of the washing 31 also communicates via a suitable line with the inlet duct 25 to the bottom chamber 4 in order to convey a flow of water into the bottom chamber 4.

Figure 2B:
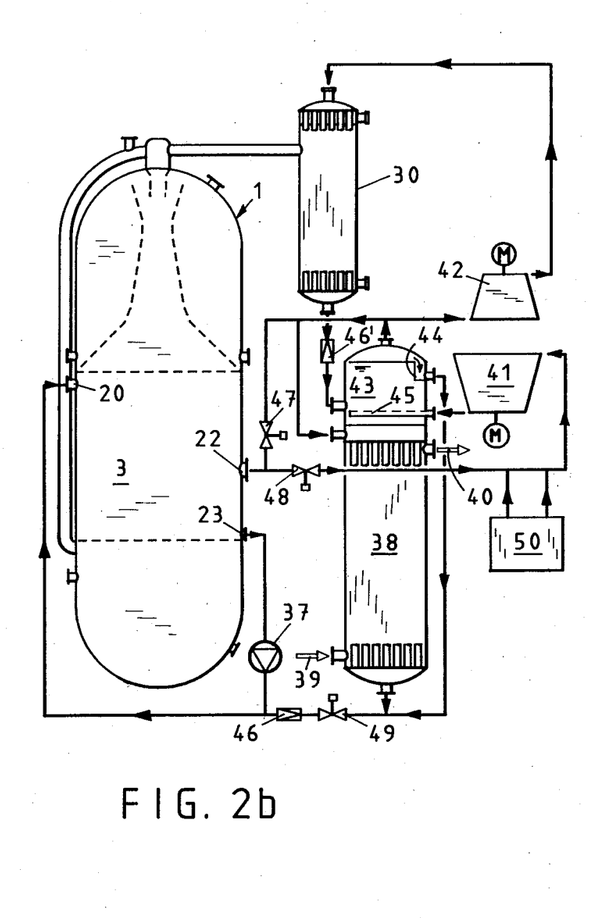
FIG. 2b schematically illustrates a coolant circulation circuit in accordance with the invention.

Referring to FIG. 2b, a coolant circulation circuit also cooperates with the ice generator 1 and includes a coolant pump 37, a condenser 38 for compressed coolant vapor with an intake union 39 and a discharge union 40 for cooling water, a pair of coolant compressors 41, 42, a pair of throttle valves 46, 46′ and a condensor/evaporator 50 arranged in parallel with the condenser/evaporator 19.

The upper part of the condenser 38 houses a separator 43 for liquid coolant which acts simultaneously as a cooler for the coolant which is compressed and super heated in the compressor 41 and which is fed by a distributor duct 45 to the separator 43. The upper part of the separator 43 is connected to an overflow 44.

The circuit also includes valves 47, 48 in the various lines for purposes as described below.

During operation, a vapor mixture is delivered through the duct 7, a mixture of water vapor and additive is passed through the duct 24 into the nozzle chamber 8 of the vapor jet compressor and water vapor which is generated during freeze drying in the chamber 2 passes into the mixing chamber 10. The vapor mixture which is introduced through the duct 7 acts as a propelling agent which, at first, by mixing accelerates the vapor mixture supplied from the bottom chamber 4 by way of the duct 24. The resulting vapor jet then acts as a propelling jet for the low pressure vapor from the freeze drying chamber 2. This low pressure vapor is then compressed while passing through the vapor jet compressor which is thus comprised of the propelling nozzle 8a, nozzle chamber 8, mixing chambers 9, 10 and diffusors 11, 12.

The additive which is used in the vapor mixture is one which is soluble in water and which boils more readily than water. During freezing, this additive is not incorporated into the ice crystals which do form from the water vapor. In the embodiment described, the additive is ethanol since the vapor pressure of the ethanol solution at the triple point is lower than the vapor pressure of pure water (6.1 mbar). That is, the vapor pressure of the triple point is reduced, for example, to 5.9 mbar in the condensation chamber 3.

The operating conditions in the freeze drying chamber 2 are advantageously such that the vapor pressure is as high as possible, for example about 5.8 mbar on the surface of the freeze drying ice crystal suspension.

During operation, it is possible to achieve a relatively low pressure ratio of, for example, about 1.1 between the freeze drying chamber 2 and the condensation chamber 3 while also handling large volume flows. This provides a favorable effect on the compression power. Accordingly, it is an advantage to use a vapor jet compressor so that the entire ice generating plant can be designed as one unit without mechanically moved parts. However, axial or radial compressors may also be used.

The vapor mixture passing from the freeze drying chamber enters into the tubes 19 extending through the condensation chamber which acts as a condenser/evaporator, and is partially condensed by heat exchange with an evaporating coolant supplied through the inlet spigot 20. During this time, "primary ice" forms during condensation of the vapor mixture on the internal surfaces of the tubes 19. Because of the additive which condenses out with the water, the primary ice grows in the form of fine ice flakes which form a heterogeneous structure of ice crystals and aqueous ethanol solution.

While it is particularly advantageous to use an additive for which the vapor pressure of the aqueous solution at the trip point is not higher than the vapor pressure of pure water at the triple point, other additives may also be used which, though soluble in water and more volatile than water, do not produce a vapor pressure reduction. For example, the additive used might be acetone. In this case, an admixture of acetone lowers the freezing point and also causes a mix of ice crystals and condensate to form in the tubes 19.

In order to move the ice particles from the tubes 19 into the bottom chamber 4, it is necessary only to melt the ice particles in the regions adjoining the two walls. To this end, a hot coolant vapor is briefly passed through the space surrounding the tubes 19 with the coolant vapor condensing on the outside of the tubes 19. After defrosting in this manner, the surfaces are covered with a film of liquid condensate. When the coolant vapor is subsequently drawn off, super cooling of the condensate film occurs followed by seed formation on the tube surfaces.

The water vapor which issues at the transition form the condensation chamber 3 to the bottom chamber 4 is enriched with ethanol and is conveyed along the duct 24 to the vapor jet compressor. The partially frozen condensate, on the other hand, is delivered to the bottom chamber 4 and is converted into an ice crystal suspension. The partly molten primary ice, that is, molten only on the surface, breaks down into splinters in the chamber 4. These ice splinters which are at a temperature below −1° centigrade are mixed with water which is low in ethanol and which is introduced through the spigot 25. This water has a freezing temperature, for example, approximately −0.5° C.

Because of the laws of physics, ice growth occurs on the surfaces of the ice splinters coupled with partial melting within the splinters. This recrystallisation process causes the splinters to break down to smaller agglomerates of ice crystals or even into individual crystals.

The primary ice thus transformed is readily flushed out of the chamber 4 through the duct 28 and outlet 29 for example a 10% ice crystal suspension. This suspension which ultimately serves to produce secondary ice and consequently the product, is washed into the counterflow washer 31, that is, the suspension substantially freed from ethanol.

The ethanol-containing water leaving the bottom of the counterflow washer 31 is heated in the counterflow heat exchanger 32 and evaporated in the vapor generator 30, which is in the form of a falling film evaporator and is heated with compressed coolant vapor. The resulting vapor then forms the ethanol-rich propelling vapor which is delivered via the duct 7 for the vapor jet compressor.

The water which exits the bottom of the vapor generator 30 is low in ethanol and is cooled in the counterflow heat exchanger 32 and fed to the circulating pump 35.

Some of the ethanol-containing water from the bottom region of the counterflow washer 31, which contains less ethanol than the condensate occurring in the tubes 19, is used to convert the primary ice into the primary ice crystal suspension in the chamber 4.

Some of the suspension of secondary ice in the chamber 2 is delivered via the outlet spigot 17 and is mixed with the suspension of primary ice leaving the upper part of the counterflow washer 31, and is then fed by the pump 35 to the upper part of the chamber 2. The ice content of this suspension is e.g. 10%.

The secondary ice generation takes place in the freeze-drying chamber 2. That is, the main ice is generated by crystal growth by freeze drying at the triple point through enlargement both of the primary ice crystals and of the recirculated secondary ice crystals.

The greater the vapor pressure during freeze drying, the greater is the particle density of the suspended ice crystals. The vapor pressure in the chamber 2 should be as high as possible, as indicated above, to minimize the compression ratio of chamber 2 to chamber 3. To achieve a high particle density of the ice crystals in chamber 2, the ice crystals arising in chamber 3 and 4 are fed continuously to chamber 2.

Some of the ice crystal suspension arising in chamber 2, with an ice content of for example 20%, is extracted from the ice generator 1 through the outlet 18 and mixed with the feed water supplied to the plant through a duct 51. The mobile suspension is then supplied through a duct 52 by means of the pump 36 to the dewatering device 33.

While the separted water from the dewatering device 33 serves both as washing water in the counterflow washer 31 and as carrier water for the washed primary ice, the end product, for example a 50% ice crystal slurry, can be passed through a duct 53 for use or further processing.

The product, which may for example advantageously be used for air conditioning in mines, also exhibits a good washing quality, so that the product can also be used, for example, for partial desalination of salt-laden pit water.

In the particular embodiment, the heat source is a refrigerator (FIG. 2b). In this case, coolant vapor which is compressed in the compressor 41 is passed after condensation in the condenser 38 and expansion in the throttle valve 46 to the chamber 3 of the ice generator 1 via the inlet spigot 20. The coolant is then evaporated by indirect heat exchange with the water vapor mixture condensing in the tubes 19 and flows back (the valve 48 being open) into the suction side of the compressor 41 via the outlet spigot 23. The non-evaporated part of the coolant exits through the outlet spigot 23 and is returned to the chamber 3 by the pump 37.

The coolant vapor needed to operate the evaporator 30 is compressed in the compressor 42 and passed after condensation and subsequent expansion in the throttle valve 46' to the coolant separator 43. In principle, the vapor compressed in the compressor 41 can be used to generate the propelling vapor.

During operation, a defrosting step can be performed to melt the ice particles out of the tubes 19. However, this defrosting interval is extremely short and therefore interferes only slightly with continuous ice generation, since the temperature rise within the tubes 19 of the condenser/evaporator is negligible.

During defrosting, the valves 48, 49 in the coolant circuit are closed, the valve 47 is open, and all pumps and compressors are operating.

Advantageously, two or more condenser/evaporators with tubes 19 of ice generators 1 can be provided in parallel. In this case, defrosting should occur in only one of these condenser/evaporators at any given time. The remainder are in normal operation and supply the vapor for the compressor 41. This situation is indicated by the block 50 in FIG. 2b, representing a condenser/evaporator 50 which may in some circumstances be multiple.

Ethanol losses are covered at a point 54 in the vapor generator 30 (FIG. 2a).

Figure 3:
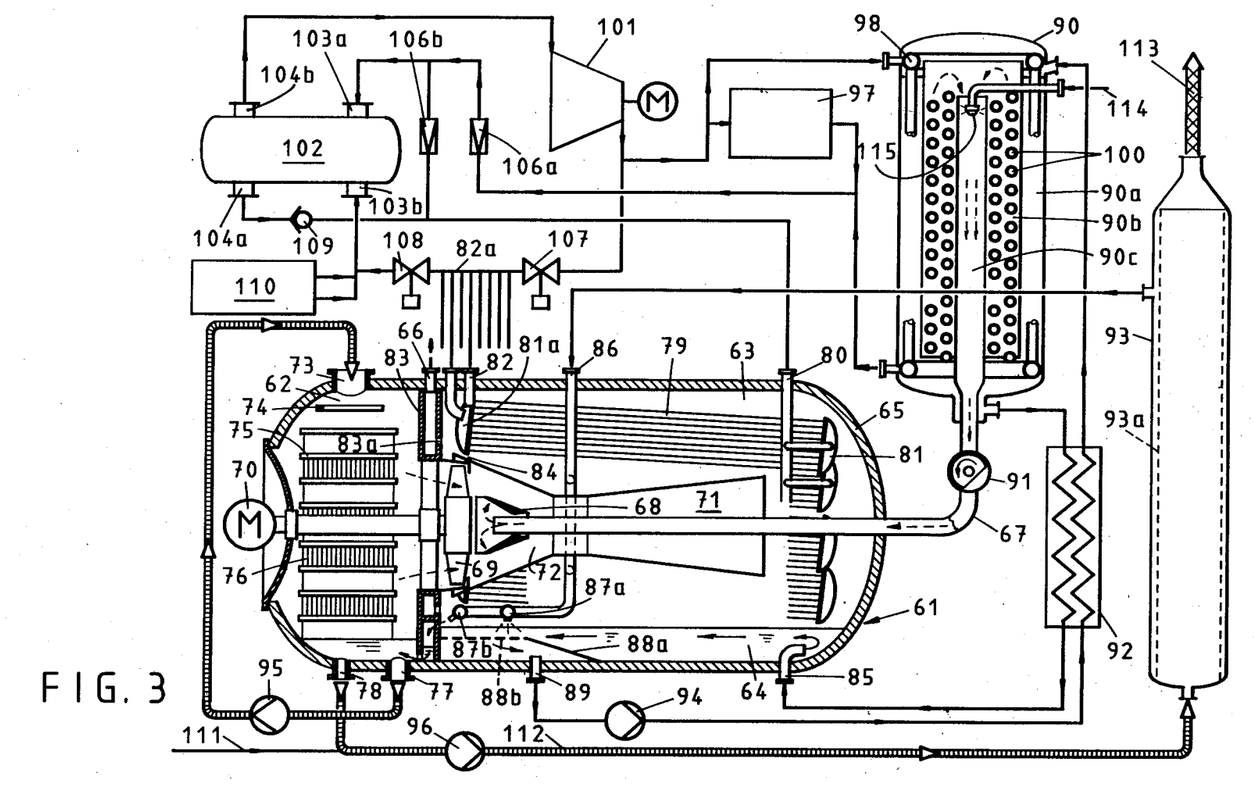
FIG. 3 illustrates a schematic view of a modified embodiment having a horizontally disposed casing in accordance with the invention.

Referring to FIG. 3, the ice generator 61 is constructed with a freeze drying chamber 62 and a condensation chamber 63 in horizontally disposed relation and a bottom chamber 64 vertically disposed below the condensation chamber 63 within a pressure-resistant casing 65. The casing 65 also has a suction duct 66 for connecting to a vacuum pump (not shown).

The ice generator 61 contains a single-stage axial compressor having an impeller 69 which is driven by a motor 70 in series with a vapor jet compressor having a nozzle 68 and a mixing chamber 72. As indicated, the two compressors have a common diffuser 71.

A distributor 74 is arranged in the freeze drying chamber 62 for recirculated ice crystal suspension. In order to guide this suspension, grilles 75 are provided below the distributor 74. The ice crystal suspension falls free in sheet form 76 over the grilles 75 during operation as indicated. The lower part of the chamber 62 is also provided with a pair of outlet spigots 77, 78 for the suspension. As indicated, one spigot 77 serves to recycle the suspension to the upper part of the chamber 62 while the other spigot 78 serves to deliver product.

The condensation chamber 63 houses an immersed condenser/evaporator having a plurality of tubes 79 which are combined to form banks with coolant distributors 81 and collectors 81a. These tubes 79 rise gently in the direction of flow so that the buoyancy of the vapor bubbles can be exploited to assist the flow of coolant.

The coolant is fed to the individual coolant distributors 81 during operation by way of an inlet union 80. The partly evaporated coolant is passed from the collectors 81a separately for each bank of tubes 79 to a collector duct 82a at the same level as a coolant separator 102. Only two of the outlet unions 82, of which there is one for each bank of tubes, are shown in the drawing.

The chambers 62, 63 are divided by a partition 83 which is hollow and contains apertures 83a. During operation, inert gases, more particularly air, brought into the plant by the feed water are drawn off through the apertures 83a, hollow partition 83 and duct 66 by a vacuum pump (not shown).

The condensation chamber 63 is connected to the mixing chamber 72 by a nozzle-like annular duct 84. Through this, the vapor which is enriched with additive (for example ethanol) in the chamber 63 during operation is recirculated.

A union 85 supplies water low in additive to the bottom chamber 64 of the ice generator 1. A sub-chamber is divided off from the bottom chamber 64 by a wall 88a and screen 88b, so as to discharge ice-free water through an outlet union 89.

The ice generator is connected, as in the first embodiment, to a product circulation circuit and a coolant circulation circuit.

During operation, the plant operates as follows. The water vapor arising during freeze drying in the chamber 62 is compressed in the axial compressor consisting of the axial compressor impeller 69 and diffuser 71. An additional contribution to compression of the vapor comes from the vapor jet compressor 68, 71 which is connected in series. The propelling medium is vapor from a vapor generator 90, supplied through a duct 67 to the ice generator 61. This vapor is enriched with an additive, for example ethanol. In the mixing chamber 72, the propelling vapor is mixed with the vapor from the chamber 62 and the additive-rich vapor flowing through the annular duct 84.

The pressure ratios in the chambers 62, 63 and 64 are as given for the first embodiment (FIGS. 1a to 2b).

The vapor mixture flowing around the tubes 79 in the chamber 63 is partly condensed on the external surfaces of the tubes 79 by heat exchange with coolant flowing through the tubes 79. During condensation of the vapor mixture on the external surfaces of the tubes, "primary ice" forms. To avoid repetition, for the physcial processes taking place in the chambers 63, 64 reference is made to the corresponding passages relating to the first embodiment.

In the present case, it is at first assumed that a rotary valve 91 in the duct 67 is open throughout operation. The vapor mixture arising in the chamber 63 thus is enriched with additive on the flow path to the annular duct 84.

The ice crystal suspension forming in the bottom chamber 64 is obtained in the same manner as in the first embodiment, by means of water which, substantially depleted of additive, is introduced through the inlet union 85.

The ice crystal suspension (primary ice) is flushed out with water, also low in additive. To this end, water from the product circulation circuit is sprayed through an inlet union 86 into the chamber 64 through nozzles 87a, 87b. The ice-free water flowing down through the screen 88b is fed by a pump 94 to the vapor generator 90 after heating in a heat exchanger 92. The thinned ice crystal suspension flows into the bottom of the freeze drying chamber 62, and is recirculated from there by a pump 95 through an inlet union 73 with some of the ice/crystal suspension (secondary ice) forming in the chamber 62.

The remainder of the ice crystal suspension (secondary ice) is discharged from the ice generator 61 through the outlet spigot 78 and mixed with the feed water supplied to the plant through a duct 111. The mobile suspension is then fed along a duct 112 by a pump 96 to a dewatering unit 93 with a tubular screen 93a. While the separated water is returned through the inlet 86 ot the ice generator, the end product, for example a 50% ice crystal slurry, can be fed along a duct 113 for use or further processing.

In this embodiment, also, the heat source is a refrigerator.

Coolant is compressed in a compressor 101, largely liquefied in a condensor 97, expanded in a throttle member 106a and fed through an inlet 103a into the coolant separator 102. During the frezing out period, liquid coolant is passed through an outlet 104a into the tubes 79 in the chamber 63, and the resulting two-phase mixture of vapor and liquid is returned through the outlets 82 (a valve 108 being open and valve 107 closed) and an inlet 103b to the coolant separator 102.

Some of the coolant compressed in the compressor 101 is liquefied in the condensor 98 in the vapor generator 90 and is combined with the coolant liquefied in the condensor 97.

The evaporator 90, which in the present embodiment is primarily intended to expel the additive from water, has three concentric chambers 90a, 90b and 90c.

The outer chamber 90a is in the form of a falling film evaporator, the additive-containing water heated in the heat exchanger 92 being partly evaporated by heat exchange with condensing coolant. During this process, the major part of the additive enters the vapor phase.

The middle chamber 90b, which is closed at the top, contains tubes of a water cooler 100, the water connections not being shown. Water condenses on the cooling water coils out of the vapor rising in the middle chamber 90b, the vapor being enriched further with additive before entering the inner chamber 90c. The middle chamber 90b might alternatively, for example, be constructed in the manner of a rectification column.

The middle chamber 90c receives liquid additive which is sprayed through a duct 114 and nozzle 115 onto the inner surface of the chamber to cover additive losses.

On the wall between the chambers 90b and 90c, the sprayed additive is evaporated on the interior while at the same time water condenses on the exterior. The water, largely depleted of additive, is extracted at the bottom of the vapor generator 90, brought into heat exchange with the water supplied, and fed to the chamber 64 of the ice generator 61.

The water vapor enriched with additive is fed through the duct 67 to the ice generator 61, the rotary valve 91 being open.

In the present case, it was assumed that the rotary valve 91 is permanently open or is not present at all. In this mode of operation, the vapor jet compressor 68, 71 is running continuously so that some of the compressor power during the freezing out process comes from the vapor jet compressor, the major part of the power being generated by the axial compressor 69.

During defrosting, the valve 108 is closed, the valve 17 is open, and hot coolant vapor is fed through the union 82 into the tube bank heat exchanger 79 and partly liquefied.

The resulting two phase mixture is then expanded in a throttle valve 106b (nonreturn valve 109 is operative) and passed to the coolant separator 102.

A block 110 represents diagrammatically a plurality of parallel condenser/evaporators of ice generators, analogous to the block 50 in FIG. 2b.

Advantageously, the rotary valve 91 is also open during the defrosting process, so that the process is accelerated by supplying enriched vapor to the ice generator 61, since the pressure in the chamber 63 rises. The rotary valve 91 may also advantageously be brought intermittently into the open and closed positions during the freezing out process proper.

During the period during which the rotary valve 91 is closed, the pressure in the chamber 63 is at the vapor pressure corresponding to the triple point or slightly below. Ice then condenses and feezes out of the vapor mixture on the surfaces of the tubes 79. When the rotary valve 91 is open, the pressure in the chamber 63 rises above the vapor pressure at the triple point, the vapor condenses without freezing. The ice formation then partly melts, and the condensate and melt collect on the underside of the tubes 79.

After the vapor supply is interrupted, the condensate freezes on the underside of the tubes, and growing ice "whiskers" form. When the ice "whiskers" have reached a certain length, for example, approximately 1 cm, it is advisable to start the defrosting phase (by supplying hot coolant). The ice "whiskers" fall off relatively quickly during defrosting, owing to their weight.

The invention thus provides a relatively simple method and apparatus for generating an ice crystal suspension by freeze drying at the triple point.

Further, the invention provides a method which can be performed on a continuous basis.

Still further, the invention provides an apparatus of relatively simple construction which can be operated at relatively low compression ratioes.

Further, the invention provides a relatively economical technique for obtaining ice crystal suspensions for large volume flows, for example for use as air conditioning in mines.

What is claimed is:

1. A method of generating an ice crystal suspension comprising the steps of
   compressing a flow of water vapor;
   admixing a water-soluble additive having a lower boiling point than water with the compressed vapor to obtain a mixture of water and additive;
   cooling the mixture in heat exchange relation with a flow of coolant to a triple point thereof;
   condensing the cooled mixture and at least partially freezing the mixture to obtain a heterogeneous mixture of ice particles and liquid; and
   thereafter freeze-drying at least a portion of the mixture of ice particles and liquid at the triple point thereof to form an ice crystal suspension.

2. A method as set forth in claim 1 wherein the additive is admixed with the compressed vapor intermittently.

3. A method as set forth in claim 1 wherein the cooled mixture is condensed on heat exchange surfaces to form ice particles thereon and which further comprises the step of defrosting the heat exchange surfaces to remove the ice particles therefrom.

4. A method as set forth in claim 3 wherein the additive is admixed with the compressed vapor only during said defrosting step.

5. A method as set forth in claim 1 wherein the heterogeneous mixture of ice particles and liquid has a vapor pressure at a triple point thereof not higher than the vapor pressure of pure water at the triple point.

6. A method as set forth in claim 1 wherein the additive is ethanol.

7. An apparatus for generating an ice crystal suspension comprising
   a first cooling chamber having heat transferring surfaces therein for receiving a flow of compressed water vapor containing a water-soluble additive having a lower boiling point than water in indirect heat exchange relation with a flow of coolant to condense and at least partially freeze out ice particles on said surfaces;
   at least one compressor for delivering a compressed flow of water vapor into said first chamber;

a second chamber connected to said first chamber for forming an ice-containing suspension from the ice received from said first chamber; and a third chamber for receiving a flow of the ice-containing suspension from said second chamber for freeze-drying therein to generate an ice crystal suspension.

8. An apparatus as set forth in claim 7 which further comprises a casing having said three chambers vertically disposed therein, said third chamber being in communication with said compressor to deliver a flow of water vapor generated during freeze drying thereto.

9. An apparatus as set forth in claim 8 which further comprises a vapor jet compressor in series with said axial compressor.

10. An apparatus as set forth in claim 7 wherein said compressor is a vapor jet compressor.

11. An apparatus as set forth in claim 9 wherein said compressor has a suction chamber and which further comprises a discharge duct connected to and between an upper portion of said second chamber and said suction chamber to return water vapor enriched with additive to said suction chamber for subsequent delivery to said first chamber.

12. An apparatus as set forth in claim 7 which further comprises a casing having said three chambers disposed therein, said first and said third chambers being horizontally disposed with respect to each other and said second chamber being vertically disposed below said first chamber.

13. An apparatus as set forth in claim 7 wherein said compressor is an axial compressor.

14. An apparatus as set forth in claim 7 further comprising a counter flow washer having a bottom end communicating with said second chamber to receive a flow of ice-containing suspension therefrom and an upper end communicating with said third chamber to deliver a flow of primary ice thereto;

a vapor generator communicating with a bottom end of said washer to receive and evaporate a flow of additive-containing water therefrom and communicating with said compressor to deliver a flow of additive-containing water vapor thereto;

a duct communicating a bottom end of said washer with said second chamber for conveying a flow of water into said second chamber; and a discharge duct connected to and between an upper portion of said second chamber and said compressor to return water vapor enriched with additive to said compressor for subsequent delivery to said first chamber.

15. An apparatus as set forth in claim 14 which further comprises a dewatering unit communicating with said third chamber to receive a flow of ice crystal suspension therefrom, and communicating with said washer to deliver a flow of separated water thereto, a discharge duct between said third chamber and said dewatering unit to deliver the ice crystal suspension to said unit, a feed duct connected to said latter discharge duct to supply water thereto and a discharge duct extending from said unit to deliver a thickened ice crystal suspension therefrom.

16. An apparatus as set forth in claim 14 which further comprises a discharge duct connected to a lower portion of said third chamber to return at least some of the ice crystal suspension to an upper portion of said third chamber.

17. An apparatus as set forth in claim 7 which further comprises a vapor generator communicating with said second chamber to receive and evaporate a flow of additive-containing water therefrom and communicating with said compressor to deliver a flow of additive enriched water vapor thereto.

18. An apparatus as set forth in claim 17 wherein said vapor generator has three concentric chambers, an outer chamber defining a falling film evaporator for evaporating the additive-containing water, a middle chamber defining a cooling chamber for condensing water and an inner chamber for evaporating admixed liquid additive and connected to a supply duct extending to said compressor.

19. An apparatus as set forth in claim 18 further comprising a controllable closure member in said supply duct.

20. An apparatus as set forth in claim 17 which further comprises a casing having said three chambers disposed therein, said first and said third chambers being horizontally disposed with respect to each other and said second chamber being vertically disposed below said third chamber.

* * * * *

UNITED STATES PATENT AND TRADEMARK OFFICE
CERTIFICATE OF CORRECTION

PATENT NO. : 4,734,116

DATED : March 29, 1988

INVENTOR(S) : CHRISTIAN EHRSAM

It is certified that error appears in the above-identified patent and that said Letters Patent is hereby corrected as shown below:

Column 3, line 31, "1b." should be -- 1a. --.
Column 8, line 27 "repetition. for" should be -repetition, for- Signed and Sealed this Eleventh Day of October, 1988

*Attest:*

DONALD J. QUIGG

*Attesting Officer*  *Commissioner of Patents and Trademarks*